United States Patent [19]

Szmanda et al.

[11] Patent Number: 5,342,005
[45] Date of Patent: Aug. 30, 1994

[54] ARM SUPPORT APPARATUS FOR KEYBOARD AND OTHER APPARATUS REQUIRING REPETITIVE HAND OPERATION

[75] Inventors: Jeffrey P. Szmanda, Milwaukee; William J. Szmanda, Menomonee Falls, both of Wis.

[73] Assignee: Health Care Keyboard Co., Inc., Menomonee Falls, Wis.

[21] Appl. No.: 972,253

[22] Filed: Nov. 5, 1992

[51] Int. Cl.$^5$ ............................................. B68G 5/00
[52] U.S. Cl. ................................. 248/118; 248/918; 400/715
[58] Field of Search .................. 248/118, 118.1, 118.3, 248/118.5, 918; 400/715; 361/222

[56] References Cited

U.S. PATENT DOCUMENTS

| | | |
|---|---|---|
| 3,990,565 | 11/1976 | Felton et al. |
| 4,378,553 | 3/1983 | McCall |
| 4,402,624 | 9/1983 | Stahl et al. |
| 4,481,556 | 11/1984 | Berke et al. |
| 4,482,063 | 11/1984 | Berke et al. |
| 4,482,064 | 11/1984 | Berke et al. |
| 4,483,634 | 11/1984 | Frey et al. |
| 4,597,681 | 7/1986 | Hodges |
| 4,621,781 | 11/1986 | Springer |
| 4,661,005 | 4/1987 | Lahr |
| 5,056,743 | 10/1991 | Zwar et al. |
| 5,058,840 | 10/1991 | Moss et al. |
| 5,067,834 | 11/1991 | Szmanda et al. |
| 5,072,905 | 12/1991 | Hyatt |
| 5,108,057 | 4/1992 | Dandy, III et al. |
| 5,125,606 | 6/1992 | Cassano et al. |
| 5,131,614 | 7/1992 | Garcia et al. |
| 5,143,341 | 9/1992 | Juster |
| 5,147,090 | 9/1992 | Mandell et al. |
| 5,158,256 | 10/1992 | Gross ............................. 248/118.3 |
| 5,161,760 | 11/1992 | Terbrack ........................... 248/118 |
| 5,163,646 | 11/1992 | Engelhardt ...................... 400/715 X |
| 5,195,705 | 3/1993 | Kline et al. ........................ 248/118.3 |

Primary Examiner—Robert W. Gibson, Jr.
Attorney, Agent, or Firm—Andrus, Sceales, Starke & Sawall

[57] ABSTRACT

A forearm support apparatus for a keyboard operator is disclosed including first and second forearm support units. Each of the support units includes a base member having a tapered wall and a flat bottom wall. A complementing upper member has a similar taper and is secured to upper wall and an inverse orientation to raise the tapered wall to a top surface. The top member is formed of a highly resilient compressible material to receive the forearm which depresses the material and supports the forearm. The support units are mounted in laterally spaced relation with the tapered upper walls extending inwardly and downwardly toward each other. The forearms are thereby biased inwardly toward each other in restrict outward displacement. The members are formed symmetrically about a transverse plane generally parallel to the keyboard. The top member has a shorter length than the bottom member to define forward and front and back recesses. In addition, the bottom member has its upper edge tapered to increase the free space to the opposite sides of the top wall. This permits optimum movement of the forearm. One of the members has a keypad section secured to the outer large end of the support unit. That unit is located to receive the forearm which operates the keyboard including the keypad section. A cotton cloth cover encloses each of the units. Movement of the forearm on the top surface will not create a static electrical charge thereby protecting the electronics of the keyboard unit. Various alternate modifications and alternate structures are also discussed.

21 Claims, 2 Drawing Sheets

ARM SUPPORT APPARATUS FOR KEYBOARD AND OTHER APPARATUS REQUIRING REPETITIVE HAND OPERATION

BACKGROUND OF THE INVENTION

This invention relates to an arm support apparatus requiring repetitive hand operation such as keyboard apparatus and particularly to an arm support apparatus in which the keyboard apparatus is sectioned and the sections are located in angulated and spaced orientation for optimum operator comfort and safety.

Operators of keyboard devices, such as word processing equipment, data processing equipment and the like, often encounter discomfort when required to continuously operate the keyboard for extended periods of time. The discomfort arises from the stresses and strains placed on the operators muscles, joints and the like in the shoulder, arm, wrist and hands when operating for an extended period of time. Generally, data and word processing keyboards include a standard typing section including alpha-numerical keys in a known format in combination with a separate control section including various machine and data control keys. A well known typing keyboard format is a QWERTY format. With a conventional flat inclined keyboard, serious stress and strain of the shoulder, arms, hands may arise which can be painful at best and may physically damage the operator. The damage apparently results from the repetitive nature and the required positioning of the hands and arms of the operator with respect to such keyboards.

A substantial number of variations in the keyboard structure have been proposed to minimize the discomfort or damage to the operator. The variations generally involve reorientation of the keys relative to the operator's position. Splitting of the keyboard into two sections for a conventional QWERTY keyboard has been suggested, with a number of variations in structure and orientation. Typical teachings can be found in the following United States patent art:

| Pat. No.  | Issue Date | Inventor    |
|-----------|------------|-------------|
| 3,990,565 | 11/1976    | Felton et al|
| 4,378,553 | 3/1983     | McCall      |
| 4,402,624 | 9/1983     | Stahl et al |
| 4,597,681 | 7/1986     | Hodges      |
| 4,661,005 | 4/1987     | Lahr        |

Notwithstanding, the attention given to the problem with present day commercial developments of keyboards, operators continue to encounter discomfort, and in fact, severe physical damage is reported by a significant number of keyboard operators.

Each operator has a substantially unique orientation requirement to provide for optimum orientation with respect to the keyboard and the physical characteristics of the operator. A particularly significant advance in the keyboard structure is disclosed in U.S. Pat. No. 5,067,834 to Jeffrey Szmanda and William Szmanda, which issued on Nov. 26, 1991 and is assigned to a common assignee with this application. As more fully disclosed in the '834 patent, the keyboard is separated into a plurality of sections, each of which is provided with a special universal mount for adjusting the spacing and orientation of each section to match each operator's requirements. Thus, the mount permits essentially unrestricted angulated orientation as well as vertical and horizontal positioning of the keyboard sections for the operator. Each operator's keyboard can be therefore uniquely tailored to that operator. If a different operator is assigned to the sectioned keyboard, the keyboard is readily readjusted to meet that particular operator's requirements and specifications. This provides particularly satisfactory physical orientation and positioning of the operator and the keyboard unit. However, even with such proper orientation, there is often a need for supporting of the arms of the keyboard operator to minimize the static load on the operator's arms. Various supports have also been suggested including hand supports, wrist supports and various arm supports. Typical examples of the teaching are available in the following prior art patents.

| Pat. No.  | Issue Date | Inventor     |
|-----------|------------|--------------|
| 4,483,634 | 11/1984    | Frey et al   |
| 4,481,556 | 11/1984    | Berke et al  |
| 4,482,063 | 11/1984    | Berke et     |
| 4,482,064 | 11/1984    | Berke et al  |
| 4,621,781 | 11/1986    | Springer     |
| 5,056,743 | 10/1991    | Zwar et al   |
| 5,058,840 | 10/1991    | Moss et al   |
| 5,072,905 | 12/1991    | Hyatt        |
| 5,108,057 | 4/1992     | Dandy et al  |
| 5,125,606 | 6/1992     | Cassano et al|
| 5,131,614 | 7/1992     | Garcia et al |
| 5,143,341 | 9/1992     | Juster       |
| 5,147,090 | 9/1992     | Mandell et al|

Again, although various devices have been suggested, continuing discomfort and physical damage is reported. Thus, the prior art supports have not solved the problem. The inventors have recognized the physical characteristics of each operator requires special orientation and support of the arms unique to that operator. The inventors have realized that generally if the forearm is provided with an appropriate support structure, discomfort and damage to the shoulder, arm, wrist and hand is significantly reduced. The analysis established that with the forearm properly supported, maximum maneuverability and efficient functioning of the operator is also established.

Further, in data processing equipment and the like, the keyboard generally includes a more or less conventional typing keyboard which can be conveniently divided into right and left sections. Data processing equipment generally will also require an additional control input section which is normally interconnected to one side of the keyboard. However, there are both left and right hand operators. Although, the more or less conventional typing keyboard remains identical, the control input section will normally be operated to the opposite side of the keyboards and will be located accordingly. An arm support, therefore, must be correspondingly provided. An alternate solution is to provide a separate control input section which can be located to either side of the split keyboard or information input keyboard. Again, the keyboard section is preferably constructed for optimum orientation with respect to the operators hand and arm positions.

There is therefore a need and demand on a continuing basis for improvement in the physical supporting of the arms of the operator particularly when the operator is to work over an extended period of time at a keyboard.

SUMMARY OF THE PRESENT INVENTION

The present invention is particularly directed to an arm support for uniquely supporting of the forearm of the operator in a comfortable position and significantly minimizing the stress and strain placed on the operator's shoulder, neck and arm. Generally, in accordance with the teaching of the present invention, an arm support apparatus is provided which is oriented to support each forearm on an inclined plane tending to direct the arms inwardly toward each other and thus toward the center of the keyboard. In accordance with another teaching of the present invention, the support is constructed with a graduated resiliency. A top portion or member of the support structure is a relatively soft material to allow convenient and comfortable location of the forearm, with the forearm depressed within the support structure. The lower portion or member beneath the top member is formed of a relatively firm but resilient material which serves to resiliently support the arm in the proper location with respect to the keyboard unit. In accordance with still a further teaching of the present invention, the arm rest apparatus is made as separate left and right support sections. The support sections are further constructed for reverse orientation which allows use for either right or left hand operators. With the reversible orientation of the sections, one section is provided with an integrated control support portion. The operator when operating the control input section need only move the arm from the inclined position to the separate control support portion of that section. Thus, the normal right hand section for a right hand operator can be reversed and used as the left hand section for left hand operators. Similarly, the normal left hand section can be reversed and used as a right hand section for the left hand operator.

For vertical adjustment, one or more releasably attached lift units secured to the bottom wall of the support have been found to provide a simple but effective system for locating the support.

More particularly in a preferred construction of the present invention, the arm support unit is constructed with a first arm support and a second arm support, each of which is selectively oriented for a left hand operator or a right hand operator. The first support is constructed for the information keyboard and the integrated control keyboard. Each support includes a bottom member of firm but preferably slightly resilient characteristic covered by a relatively soft top member. In a practical construction, the bottom member has a tapered top wall which in use tapers from the outer side of the keyboard section laterally inwardly and determines a force location tending to move the arm inwardly to the center of the split keyboard sections. The upper top member is formed as a complementing tapered member secured to the top of the bottom member and defining a generally horizontal upper wall. The forearm, in resting on this soft top member, readily depresses the top member to provide a grooved support of a soft resilient nature to the forearm. A control section is provided as a lateral extension of the forearm support on the info support member. This control section again includes a firm bottom member and a soft top member, both as extensions of the inclined members. The control section is formed with a top horizontal wall to support the forearm for manipulation of the control keyboard section.

In a further feature and construction for optimum comfort and support, the length of the soft top member is made somewhat shorter than the firm support member. In addition, the forward and rearward edges of the soft top member are tapered and provide optimum unrestricted for angulated positioning and movement of the forearm as the typist moves over the aligned keyboard section. This provides optimum freedom of movement of the fingers and wrist as required for effective operation of the keyboard.

The opposite or second forearm support member is constructed essentially identical to the first support member without the control section.

The support members are symmetrical along a center transverse plane parallel to the keyboard such that reversing of the orientation results in similar support for left hand operators and right hand operators.

The arm support is constructed to hold the support in a substantially fixed position during keyboard operation. The upper surface is constructed to allow movement of the arm toward and from the keyboard. Slight arm movement is again necessary for effective keyboard operation. In a practical construction, a cotton fabric cover is fastened to the support. The inventors have found that the top surface must be specifically formed to avoid creation of static electricity, which if created, can disrupt the electronics of a keyboard unit.

The present invention thus provides a highly improved forearm support adapted for angulated split keyboards, and particularly of the construction disclosed in U.S. Pat. No. 5,067,834.

BRIEF DESCRIPTION OF THE DRAWINGS

The drawings herewith illustrate the best mode presently contemplated for carrying out the invention and are described hereinafter.

In the drawings.

DESCRIPTION OF THE ILLUSTRATED EMBODIMENT

Figure 1:
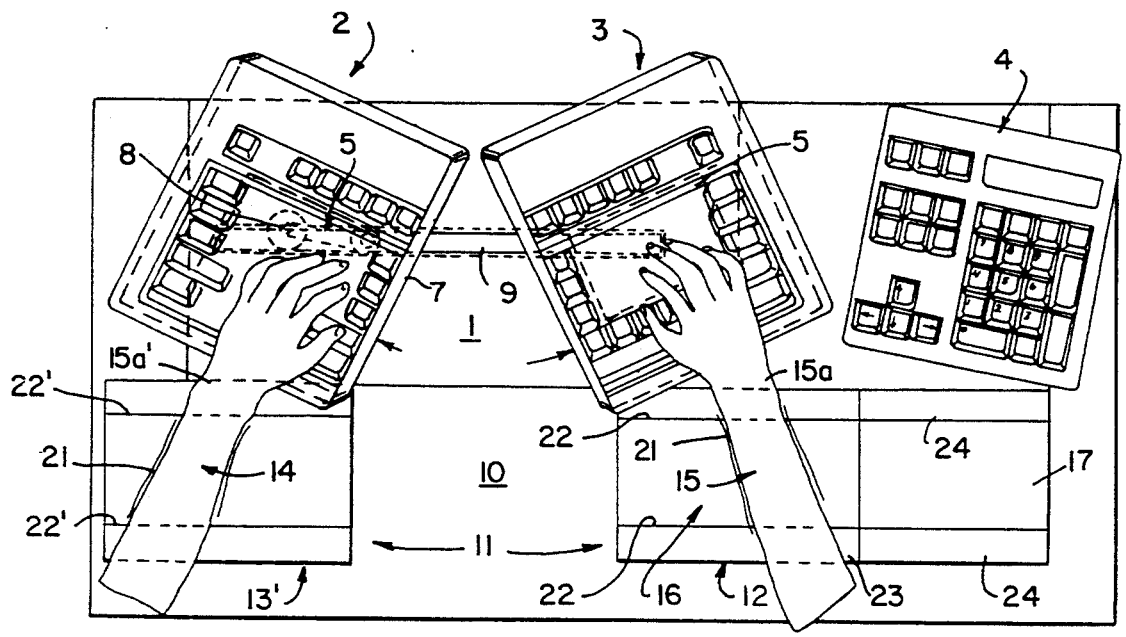
FIG. 1 is a plan view of a keyboard apparatus in combination with a forearm rest apparatus constructed in accordance with the teaching of the present invention.

Referring to the drawings and particularly to FIG. 1, a typical keyboard apparatus 1 is illustrated as more fully disclosed and described in U.S. Pat. No. 5,067,834. The illustrated keyboard generally includes three separate sections 2, 3 and 4. The keyboard sections 2 and 3 essentially correspond to a conventional typewriter or word processing keyboard and section 4 for a machine and data control keyboard.

As more fully disclosed in the above patent, each keyboard section 2 and 3 is provided with a universal mount unit 5 which allows essentially unrestricted orientation of each of the keyboard sections independent of any other sections. Referring to section 2, the mount includes a universal mount arm 6 secured to the underside of the keyboard housing 7. A universal ball unit 8 is secured to the bottom of arm 6 and in base support track unit 9. Arm 6 is vertically adjustable and unit 5 is adjustable vertically and is supported in sliding track unit 9 for lateral placement of the keyboard section. By release of the rotating lock mechanism, the user can place the keyboard in optimum orientation relative to the particular keyboard operator section. An improved three point support structure developed by the present inventors is disclosed in pending PCT application Ser. No. PCT/US91/05657, filed Aug. 8, 1991, and has been disclosed by the inventors in various publications. Unit 5 has been shown for simplicity of disclosure.

Upon proper setting of the keyboard section, an arm support assembly 11 is mounted on the counter 10. In the illustrated embodiment, the support unit 11 includes separate units 12 and 13 for each of the operative forearms 14 and 15. The separate units 12 and 13 are located for supporting the forearms with the hands located for convenient and efficient operation of the keys with minimal stress condition within the shoulder, forearm, wrist and hands.

The forearm support units 12 and 13 are constructed to firmly engage the counter or other keyboard support unit to hold the support units in pre-positioned placements and thereby preselect the positioning of the forearms, as hereinafter described. Although the support units may be provided with adjustable interconnections, the units are preferably formed as completely separate ends for completely independent placement with respect to the operator's forearms with respect to the keyboards. The units are preferably so supported as to prevent sliding movement on the support structure as a result of lateral forces created by the forearms, such as proposed in certain prior art systems. Such prior sliding supports may advantageously incorporate the reorientation of the upper wall for supporting of the forearms as well as the other unique features of the present invention in accordance with the teaching herein and the subject matter of the claims.

Figure 2:
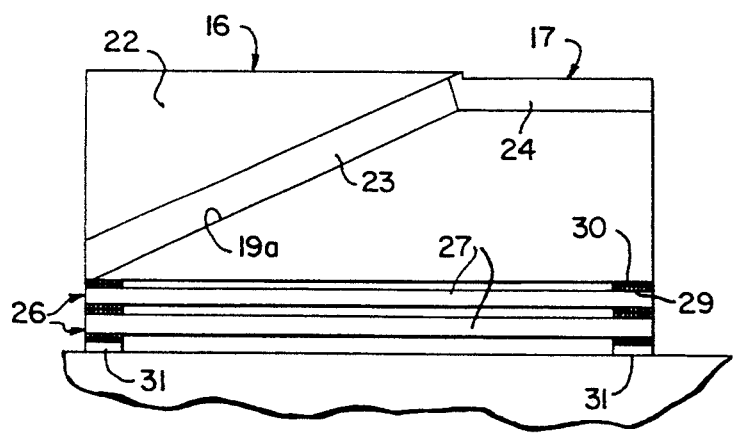
FIG. 2 is a side elevational view of the arm rest illustration in FIG. 1, with parts broken away and sectioned to more clearly illustrate detail of construction.
Figure 3:
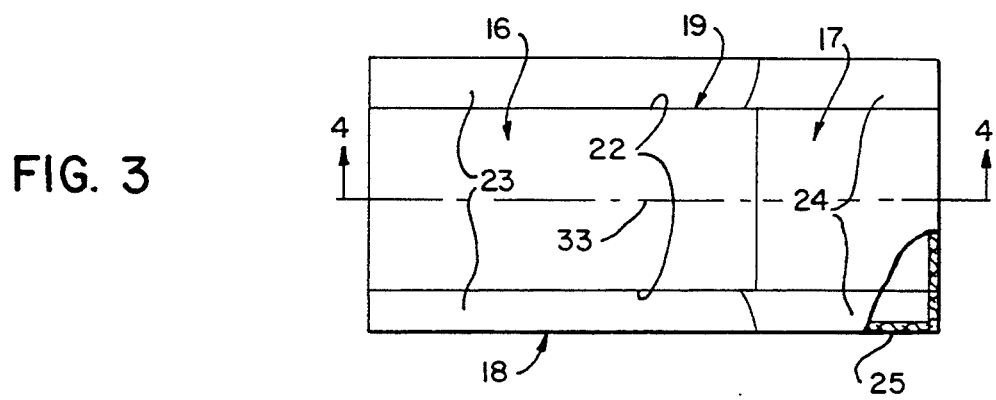
FIG. 3 is a top elevational view of the forearm rest shown in FIGS. 1 and 2.

More particularly, as most clearly shown in FIGS. 1 and 2, the forearm support unit 12 is located to support the forearm and hand which operates the information section and adjacent control section of the keyboard apparatus 1. The unit 12 includes an inner wall portion 16 for supporting the forearm and an immediately adjacent horizontally planar wall portion 17 for supporting the forearm in alignment with the control support section 4. The wall portion 16 is shown with a slightly longer length than the adjacent control portion 17 which is more or less illustrated as a square portion. The wall portions 16 and 17 are shown as an integrated member joined at a common interface and extend laterally in opposite directions therefrom, with the surface of wall portion 14 slightly below the adjacent wall portion 13.

The support unit is particularly constructed with upper top wall portion defining an inclined support which extends inwardly and downwardly inclined surface from the lateral outer portion. The support unit 12 thereby tends to position and support the arm in place and creates a limited restriction on the outward movement of the forearm. The support unit 12 includes an integral base or bottom member 18 and a top member 19. The bottom member 18 is preferably a firm resilient member. The top member 19 is a relatively soft resilient member.

The top and bottom members, for example, may be formed of a suitable plastic or rubber and a particularly satisfactory material is a plastic foam sold under the trademark Ultracel by PolyTek Products Inc., 12500B West Silver Spring Road, Butler, Wis. 53007. The cover or top member 19 is formed of a substantially softer and resilient material than the top member. The soft top member may, for example, be selected having a density of 1.8 pounds per cubic foot and a indentation force deflection of 10 pounds. The density of the bottom member may be on the order of 2.6 pounds per cubic foot and have a force deflection on the order of 65 pounds.

Figure 4:
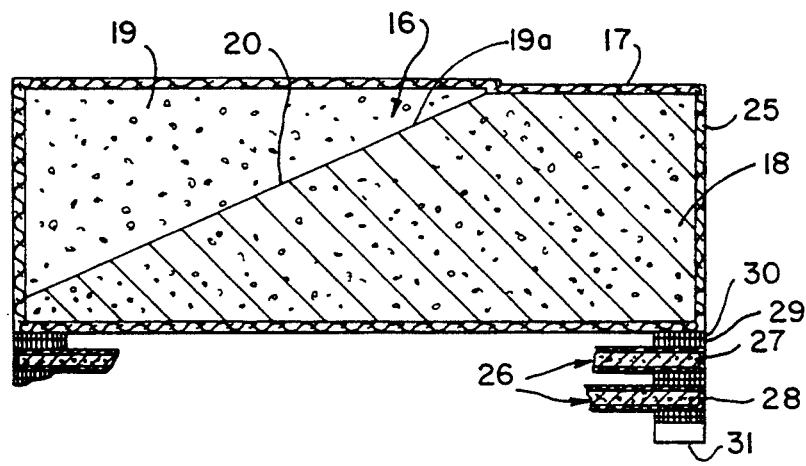
FIG. 4 is a transverse section taken generally on line 4—4 of FIG. 3.

In the illustrated embodiment, a comfortable inclined wall structure is formed as follows: the bottom member 18 is formed with an inclined top wall 19a and a flat bottom wall, as most clearly shown in FIGS. 2 and 4. The top member 19 is formed as a tapered member which is substantially the inverse of member 18 and is secured to member 18 with a bottom tapered wall secured to wall 19a as at interface 20. The top wall of member 19 is shown as a flat wall located slightly above the top wall of the adjacent keyboard support section 17 of the support unit 12. The soft character of the top member 19 results in depressing thereof and forming a recessed portion about the forearm 15, as at 21. The inclined wall 19a established the desired laterally inwardly directed bias on the forearm.

The top and bottom members 18 and 19 are bonded to each other in any suitable member such as by use of an interposed adhesive, thermal bonding or the like, such as shown by the interface connection 20.

For the control or key pad section 4, the whole portion is formed of the firmer resilient material and as a bottom member. The key pad section 4 is used much less frequency then the information portion, and the firmer surface allows convenient lateral movement of the arm over the key pad portion. If the bottom member is formed of a solid or essentially non-resilient material, a soft top cover may be provided to maintain comfortable support of the forearm.

With the forearm positioned on the soft top member 19, the member readily collapses to provide a soft comfortable support for the forearm 15. The depression in the member 19 tends to hold the arm in the desired position placed by the operator, with the force being transmitted downwardly into the firmer resilient support member.

Figure 5:
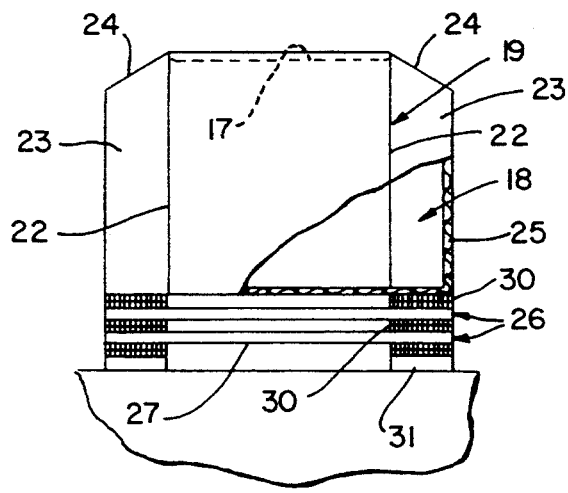
FIG. 5 is an end view with parts broken away and sectioned.
Figure 6:
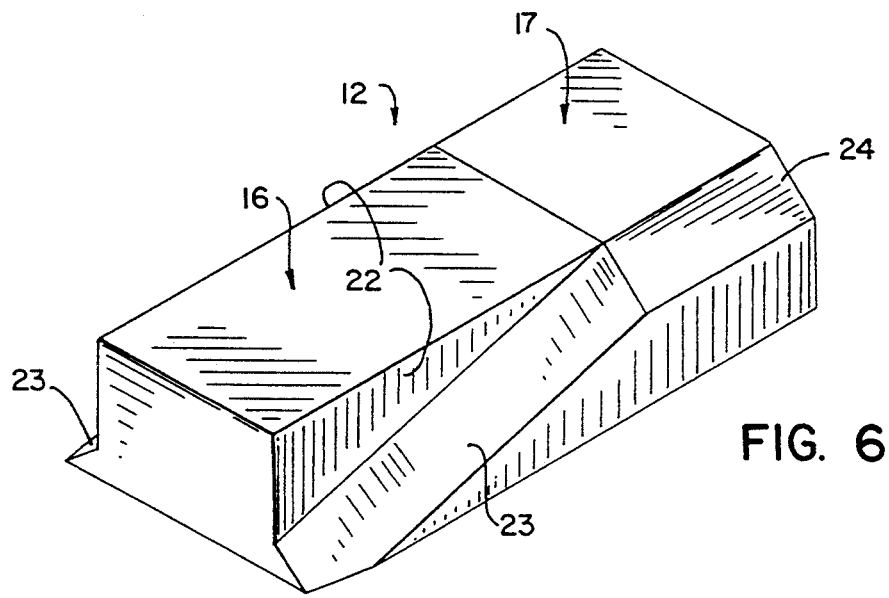
FIG. 6 is a pictorial view of an arm support shown in FIGS. 1–5.

As most clearly shown in FIGS. 2 and 5, the soft top member 19 is formed having a length somewhat less than that of the bottom member 18, to establish an offset of the edges or sidewalls adjacent the operator and the keyboard, as at 22. In addition, the front and back edges of the bottom member 18 are similarly chamfered, as at 23 and 24. The set back provided by the narrow construction of the top member 19 and the chamfered edges 23 of the bottom member establishes a free area allowing the angulated movement of the forearm on the support unit without engagement of the relatively firm undersupport member, and more significantly an unobstructed area beneath the operators wrist portion 15a. The enlarged bottom member 18 thus provides an extra margin of firm foam to the front and back side of the soft top inclined member for improved arm support for operating the keyboard. The recessed portion acts as an appropriate spacer for supporting of the operator forearm 15 with the wrist 15a overlying the removed area and provides freedom of movement to the hand and wrist while in the "hand shake" position. The free space accommodates the slight infrequent but necessary ulnar movement or deviation of the forearm toward and away from the keyboard in order to operate the keys at the bottom of the keyboard such as the back spaced unit, the enter, shift, control tabs, caps and lock keys normally found on the conventional keyboard. The free space also leaves the wrist free for its necessary motion in the operation of the keyboard.

The undersupport structure of the bottom member 18 also provides additional support for the forearm portion most closely located to the elbow. Thus typically, the angle of the forearm in operating the keyboard is such that the hands are more closely spaced than the elbow portions, as generally shown in FIG. 1. The forearm's outward angle distributes the greater weight adjacent the elbow to the outside firmer foam undersupport of the bottom member. Thus, the tapered portion of the system locates the forearm in the thinner upper portion of the top member, with the forwardmost portion of the forearm extending laterally across the support into the thicker foam portion. The use of a firmer bottom member of a somewhat resilient material continues to maintain a totally resilient support of the total forearm. The bottom member can be however an essentially rigid member within the broadest concept of the present invention particularly with appropriate modification to the depth of the top cover member in the forearm/elbow area but is preferably a reasonably firm but resilient material as discussed above.

The support units 12 and 13 is preferably enclosed within an outer cover 25 such as a soft cloth cover, as shown applied to unit 13 in the illustrated embodiment of the invention. The cloth cover 25 may be attached in any suitable manner including forming and sewing along an underseam. The upper wall surface is of course preferably unobstructed. The material of the cover should allow movement over the surface as required for operation of the keys, as previously discussed. The inventors have found that it is important to form the cover with a material which avoids the possibility of generating static electricity in the operator or the cover as the arm moves over the surface of the support. Creation of a static electrical charge can result in a discharge adjacent the keyboard apparatus. Such discharge can create a field which interacts with the keyboard apparatus to cause malfunction and shut down of the keyboard operating system. In particular, a cotton cloth cover 25 has been found to provide a particularly practical and operative cover. Other suitable materials should be selected to allow the convenient arm movement.

Changes in vertical orientation may be required depending upon the available support for the keyboard, the physical characteristic of the operator and the like. In a preferred construction, a plurality of similar vertical support elements 26 are shown for vertical adjustment of the arm support unit, as shown in FIGS. 2-4 and 5. Each of the support elements 26 structures is similar including a block-like pad member 27 generally having a peripheral configuration corresponding to that of the bottom member 18 of the arm support unit, and may be formed of a similar material to that of the bottom member, or any other suitable material. The member 27 is shown enclosed in a cloth cover 28 with Velcro attachment units 29 and 30 releasably attached to the unit cover 25 and the element 26 in the four corners of the abutting cloth covers. The underside of the support unit 13 is provided with the similarly located Velcro attachment units 30. The top side of the vertical support element is similarly constructed with a Velcro attachment unit 29 for stacking of the vertical adjustment elements. In addition, a non-skid pad element 31 is affixed by a Velcro attachment to the lowermost element 26 secured to the support unit 13 and holds the support unit in substantially fixed relation on the keyboard support.

The units 12 and 13 are formed with a symmetrical construction about a transverse plane 33 parallel to the keyboard apparatus provides for both right and left hand operators. Thus, by reversing of the position of the two control units 12 and 13, the units are appropriately located for operation by the left hand of the operator, while maintaining of the unique inclined support appropriately located for the left and right forearms.

The opposite forearm support unit 13, shown to the left in FIG. 1, is formed as a simple tapered assembly, with a relatively firm base or bottom member 21 and a relatively soft top member. Again, the top member is somewhat narrower than the base and provided with opposite chamfered front and back edges to define free areas 23 and 24.

Various embodiments of the invention can be made incorporating one or more of the basic teachings of the present invention. Thus, a support apparatus can be formed without the different resiliency or as a total firm unit, or with a multiple graded resiliency and support characteristic which is made in a progressive or stepped manner. Further, the arm support section may of course be formed as completely separate individual sections for either left hand or right hand operators for mounting to one side of the keyboard arrangement. Of particular significance in connection with a forearm support structure for split keyboards which are angulated, such as disclosed in U.S. Pat. No. 5,067,834 as well as other split keyboards, is support of the forearms biased inwardly to the center of the angulated keyboard sections. Similarly, the materials used are not critical but the combination of an upper soft support and a substantially firmer bottom support has been found to produce a particularly satisfactory and stress minimizing construction while maintaining ready maneuverability by the operator to maintain efficient keyboard operations.

The forearm support assembly is preferably formed including separate units such as disclosed to be individually preset in given positions on a supporting surface. The support assembly may of course be constructed as single integrated assembly with or without adjustable mounting and with any suitable adjustable undersupport for affixing to a table or other keyboard structure. The assembly may even be formed with a suitable undersupport for resting on the legs of the operator, such as by providing a cushioned base member formed of a resilient foam plastic or any other material and adapted to span the legs of an operator immediately adjacent to the keyboard. The support units again are preferably separately but firmly attached to such a leg support.

Various modes of carrying out the invention are contemplated as being within the scope of the following claims particularly pointing out and distinctly claiming the subject matter which is regarded as the invention.

We claim:

1. A forearm support apparatus for a keyboard operator aligned with a keyboard comprising an arm support assembly having first and second forearm support units spaced for alignment with left and right forearms of the operator, each of said units being formed with a top wall engagable by the forearm of the keyboard operator, said top walls of said support units being constructed with an incline support extending inwardly toward each other and thereby support the forearms in corresponding relationship and supporting the forearms against lateral outward displacement.

2. The apparatus of claim 1 wherein said support units are separate units for lateral displacement into alignment with the forearms of the operator, and thereby adapted for keyboard and operator orientation.

3. The apparatus of claim 1, wherein each of said top walls being formed of a relatively resilient soft material establishing a depressible engagement with the forearm of the operator.

4. The apparatus of claim 1, wherein each of said units includes a bottom member and a top member, said bottom member being formed of a relatively firm resilient material and said top member being formed of a relatively soft resilient material establishing a depressible engagement with the forearm.

5. The apparatus of claim 4 wherein said bottom member having an inclined wall adapted to extend laterally and downwardly of the position of said forearm and thereby support said forearm for limited motion or horizontal movement in a given horizontal plane, and said top member having a similar inclined wall abutting said inclined wall of said bottom member.

6. The forearm support apparatus of claim 4 wherein said body unit has a vertical end wall with said incline support extending therefrom, and an integral support section is secured to the end wall of said body unit and projecting laterally therefrom to define a planar support section.

7. The forearm support apparatus of claim 1 wherein said top wall includes a surface material to eliminate creation of a static electrical charge as a result of the operative engagement by a forearm.

8. A forearm support apparatus for supporting the forearm of a keyboard operator, comprising a first forearm support unit and a second forearm support unit, each of said support units having a support structure with a similar operative tapered upper wall, a placement assembly for supporting said support units with said tapered walls located in laterally spaced relation and tapering downwardly and inwardly toward each other for receiving of said forearms and restricting lateral outward displacement of said forearms in any given horizontal plane.

9. The forearm support apparatus of claim 8 wherein each of said support structure includes a bottom member and a top member, said top member being fixedly secured to said bottom member, said top member being formed of a resilient compressible material whereby resting of the forearm thereon depresses the material, said bottom member being formed of a substantially firm material.

10. The forearm support apparatus of claim 9 wherein said compressible material establishes depressible engagement with the forearm resting thereon.

11. The forearm support-apparatus of claim 8 wherein each of said support units includes a bottom member and a top member, said top member being fixedly secured to said bottom member, said top member being formed of a resiliently compressible material whereby resting of the forearm thereon depresses the material, said bottom member being formed of a substantially firm resilient material while providing a resilient support for said forearm in response to downward pressure exerted by said forearm, said bottom member having said tapered upper wall, and said top member having a similarly tapered wall abutting said tapered upper wall.

12. The apparatus of claim 11 wherein said top member has a horizontal top surface.

13. The forearm support apparatus of claim 11, wherein said body unit has a vertical end wall with said incline support extending therefrom, and an integral support section is secured to the end wall of one of said support units and projecting laterally therefrom to define a planar support section.

14. The forearm support apparatus of claim 11 wherein said top wall includes a surface material to eliminate creation of a static electrical charge as a result of the operative engagement by a forearm.

15. The forearm arm support apparatus of claim 11 having a front side located adjacent the keyboard and a rear side located adjacent the operator, and wherein said top member has a front-to-back length significantly shorter than said bottom member whereby said bottom member has a front edge wall and a back edge wall spaced outwardly of said top member, said front and back edge walls of said bottom member being chamfered and with said top member defining a free area on the front and back sides of said members for permitting different angular orientation of said forearm without significant engagement with said bottom member.

16. The forearm support apparatus of claim 8 wherein said top wall includes a surface material to eliminate creation of a static electrical charge as a result of the operative engagement by a forearm.

17. The forearm support apparatus of claim 8 wherein said placement assembly includes members secured to bottom member to establish frictional engagement with a support member to restrict movement of a support unit with the forearm.

18. The apparatus of claim 8 including a vertical adjustable support assembly for each of said forearm support units, comprising a plurality of individual pad members having a selected thickness, each of said pad members having releasable attachment units similarly arranged on the top and bottom walls for releasably stacking said pad members to vary the total thickness thereof with exposed attachment units on the top and bottom pad members in said stacked members, a mounting assembly having a releasable attachment unit on a top surface and a friction member on a bottom surface, each of said support units having a bottom wall with a releasable attachment unit for securing thereof to a mount assembly for direct mounting of said support units and for securing one or more of said pad members to said bottom wall for mounting the unit in a raised position to said support unit.

19. A forearm support apparatus for an operator of a multifinger device having a plurality of adjacent finger actuated elements and for holding a forearm in a relatively constant position while completing repetitive hand and finger movement of said elements, comprising a first forearm support device having a top wall engagable by the forearm of the multifinger operator, said top wall of said support device being inclined inwardly toward the other arm to support the forearm in corresponding relationship and supporting the forearm against lateral outward displacement, said top wall including a relatively resilient soft material establishing a depressible engagement with the forearm of the operator.

20. The apparatus of claim 19 including a second forearm support device, said first and second forearm device adapted for lateral displacement into alignment with both forearms of the operator, each of said devices being identical in structure.

21. The apparatus of claim 19 wherein said device includes a top surface engaged by said forearm, said surface constructed to avoid forming of a static electrical charge in response to movement of said forearm on said surface.

* * * * *